United States Patent [19]

Fukuda

[11] Patent Number: 5,695,421
[45] Date of Patent: Dec. 9, 1997

[54] ELASTOMER COATED COIL SPRING AND CHAIN DERAILLEUR EMPLOYING SAME

[75] Inventor: Masahiko Fukuda, Amagasaki, Japan

[73] Assignee: Shimano Inc., Osaka, Japan

[21] Appl. No.: 604,319

[22] Filed: Feb. 21, 1996

[51] Int. Cl.⁶ .................................................. F16H 59/04
[52] U.S. Cl. .................................................... 474/82
[58] Field of Search ........................... 474/82, 80, 78, 474/69, 119, 122, 127; 280/260, 261; 267/33, 168, 179

[56] References Cited

U.S. PATENT DOCUMENTS

| | | | |
|---|---|---|---|
| 4,552,546 | 11/1985 | Ishikawa | 474/82 |
| 4,690,663 | 9/1987 | Nagano . | |
| 4,763,882 | 8/1988 | Nishiyama et al. | 267/33 |
| 4,793,597 | 12/1988 | Smith | 267/33 |
| 4,869,471 | 9/1989 | Schwartz et al. | 267/33 |
| 5,102,372 | 4/1992 | Patterson et al. . | |
| 5,302,155 | 4/1994 | Ishibashi . | |
| 5,310,167 | 5/1994 | Noll, Jr. | 267/33 |
| 5,482,261 | 1/1996 | Ortega | 267/168 |

FOREIGN PATENT DOCUMENTS

| | | |
|---|---|---|
| 0 653 346 | 5/1995 | European Pat. Off. . |
| 0 655 386 A1 | 5/1995 | European Pat. Off. . |
| 1049809 | 1/1954 | France . |
| 34 00 432 | 7/1985 | Germany . |
| 56-90136 | 12/1979 | Japan ............................ 267/168 |

*Primary Examiner*—Tamara L. Graysay
*Assistant Examiner*—Tony Boyd
*Attorney, Agent, or Firm*—Shinjyu Office of Patent Attorney

[57] ABSTRACT

A bicycle chain derailleur is biased against the movement of a cable by a first spring that has enhanced biasing characteristics. In accordance with one embodiment of the present invention, the enhanced biasing characteristics are provided by the addition of a second spring element, where the second spring is an elastomer coating formed on coils of the first spring. In another embodiment a torsion spring is disposed in the chain derailleur which works in concert with the first spring to enhance the biasing characteristics. In yet another embodiment, both the elastomer coating and the torsion spring are employed.

16 Claims, 5 Drawing Sheets

5,695,421

ELASTOMER COATED COIL SPRING AND CHAIN DERAILLEUR EMPLOYING SAME

BACKGROUND OF THE INVENTION

A. Field Of the Invention

The invention relates to an elastomer coated coil spring and a chain derailleur that uses the elastomer coated coil spring to bias the chain derailleur toward one gear of a bicycle chain gear.

B. Description of the Related Art

Bicycle chain derailleurs are used to change the position of a chain on a bicycle gear sprocket. The position of the chain on a bicycle gear sprocket determines the gear ratio of the bicycle, which in turn provides a variety of gear speeds at which a bicycle rider pedals the bicycle. Typically, chain derailleurs include a link structure which is mounted to a bicycle frame adjacent to a wheel axle. The link structure is typically a parallelogram pantograph-like structure. One portion of the link structure is fixed to the frame and the other three portions of the link structure pivot with respect to the fixed portion. A cable manipulated by the bicycle rider controls the position of the link structure and a spring biases the link structure against the movement of the cable.

One disadvantage to the above structure is that a single spring biasing the link structure may be insufficient to properly bias the link structure. Further, after continued chain movement by the chain derailleur, the spring may become fatigued and loose a portion of its ability to bias the link structure. Further, if the chain derailleur becomes dirty or pivot joints in the link structure become dry or loose their lubrication, the spring may not have sufficient biasing force to properly bias the link structure into position.

It is therefore desirable to increase the biasing force of the spring. Unfortunately, increasing the biasing force of the spring usually includes increasing the diameter of the spring. Increasing the dieter of the spring is not always possible because chain derailleurs have size requirements in order to be practical on bicycles. Therefore, increasing the size of the chain derailleur in order to accommodate a larger spring is not a practical design option.

A derailleur has been proposed in which two torsion springs are employed in the link structure. Torsion springs typically include a coil section having three or four windings or coils in contact with each other and two extending legs. The torsion springs are mounted in the link structure at opposing pivot points to bias the link structure. One problem with using torsion springs is that the coils or windings, being in constant engagement with each other, continuously rub against each other as the torsion spring is flexed and unflexed. The continuous contact creates friction. Over an extended period of time, the friction causes wear and the degradation of the springs biasing characteristics. Further, in some derailleur configurations, it may not be possible to properly position two torsion springs.

SUMMARY OF THE INVENTION

One object of the present invention is to increase the biasing force of a spring without significantly increasing the diameter of the spring.

In accordance with one aspect of the present invention, a chain derailleur includes a base member and a link mechanism. The link mechanism includes a first member connected to the base member, the first member having a first and second pivot axis defined thereon. The link mechanism also includes first and second links, the first link mounted for pivotal movement to the first member at the first pivot axis, the second link mounted for pivotal movement to the first member at the second pivot axis and a second member having third and fourth pivot axis defined thereon, the first link mounted for pivotal movement to the second member at the third pivot axis, the second link mounted for pivotal movement to the second member at the fourth pivot axis. A coil spring is mounted within the link mechanism urging the first and fourth pivot axis toward one another. A second spring mounted within the link mechanism also urges the first and fourth pivot axis toward one another.

In one embodiment of the present invention, the second spring is a torsion spring mounted about one of the pivot axis. Still more preferably, the torsion spring has first and second extending legs which engage a portion of the first member and a portion of the first link, respectively.

In another embodiment of the present invention, the second spring is a second coil spring disposed concentrically within the coil spring.

In yet another embodiment, the second spring is an elastomeric coating formed on the coil spring. However, the elastomeric coating could also be formed on an outer periphery of the coil spring, the elastomeric coating defining the second spring.

Preferably the coil portion of the coil spring has the elastomeric coating formed on at least two adjacent coils of the coil portion, the elastomeric coating defining the second spring.

In yet another embodiment of the present invention, the coil spring has a first and a second end, the first end being connected to the first member adjacent to the first pivot axis and the second end being connected to the second member adjacent to the fourth pivot axis.

In another aspect of the invention, a coil spring includes a coil portion having legs extending therefrom and an elastomeric coating formed on the coil portion.

Preferably, the elastomeric coating is a silicone rubber material. However, the elastomeric coating may alternatively be made of a nitrile rubber material. The elastomaric coating may also be a synthetic elastic material.

Preferably, the coil portion has the elastomaric coating formed on an outer periphery thereof, the elastomeric coating defining a second spring.

Preferably, the elastomeric coating is formed on at least two adjacent coils of the coil portion.

These and other objects, features, aspects and advantages of the present invention will become more fully apparent from the following detailed description of the present invention when taken in conjunction with the accompanying drawings where like reference numerals denote corresponding parts throughout, in which:

DETAILED DESCRIPTION OF THE PREFERRED EMBODIMENTS

Figure 1:
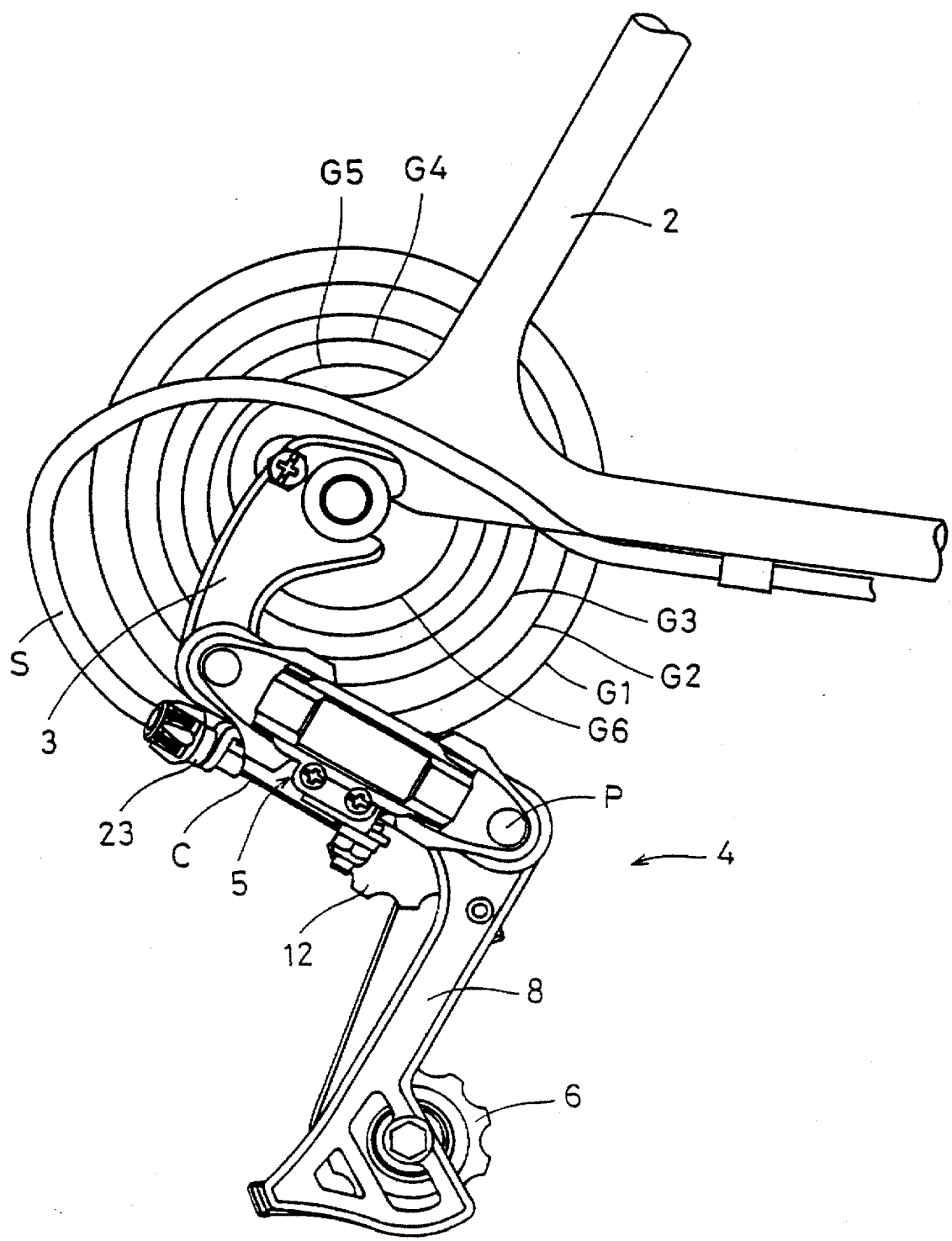
FIG. 1 is schematic side elevation of a chain derailleur mounted to a bicycle frame in accordance the present invention.

In FIG. 1, a bicycle frame 2 is depicted with a multiple gear sprocket having six gears, G1–G6. A gear derailleur mechanism 4 is also shown attached to the bicycle frame 2. A cable C having a cable shield S is connected to the gear derailleur 4.

Figure 2:
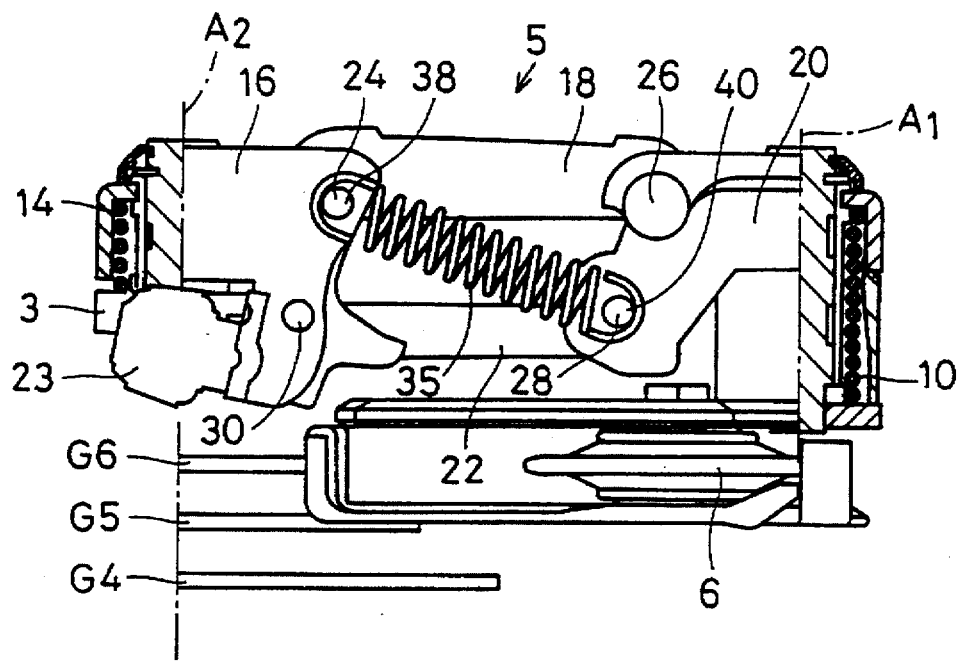
FIG. 2 is a sectional view of the chain derailleur depicted in FIG. 1, on a slightly enlarged scale, showing a link mechanism biased by a coil spring, with the link mechanism in a first position.

The gear derailleur mechanism 4 includes base 3, a link structure 5, a guide plate 8 attached to a portion of the link structure 5 and a tension wheel 6 that is attached to the guide plate 8. The tension wheel 6 is rotatable with respect to the guide plate 8. The guide plate 8 is pivotal about a pivot joint P on the gear derailleur mechanism 4 and is biased against movement of a chain (not shown) by a spring 10 which is shown in FIG. 2. The pivot joint P defines a pivot axis A1 which also shown in FIG. 2.

Also mounted on the guide plate 8 is a guide wheel 12. It should be noted that the tension wheel 6 and the guide wheel 12 are co-planar and that in FIGS. 2, 3, 5, 6 and 8 the tension wheel 6 obscures the view of the guide wheel 12.

The link structure 5 pivots with respect to the base 3 about an axis $A_2$, shown in FIG. 2. The link structure 5 is biased against the movement of a chain (not shown) by a spring 14. The link structure 5 includes a first member 16, a first link 18, a second member 20 and a second link 22. The first member 16 includes a cable shield support 23 through which the cable C extends. The first link 18 has a first end and a second end. The first end of the first link 18 is mounted to the first member 16 for pivotal movement about a first pivot axis 24. The second link 22 also has a first and a second end, the first end of the second link 22 is connected to the first member 16 for pivotal movement about a second pivot axis 30. The second member 20 is mounted to the second end of the first link 18 for pivotal movement about a third pivot axis 26. The second member 20 is also mounted to the second end of the second link 22 for pivotal movement about a fourth pivot axis 28. Movement of the cable C causes the link structure 5 to pivot such that as the cable C is drawn into the cable shield S, the second member 20 moves downward in FIG. 2 and the second end the first link 18 and the second end of the second link 22 likewise move downward in FIG. 2.

It should be understood that the first link 18 and the second link 22 are generally parallel, but need not necessarily be perfectly parallel. Further, the first and second links 18 and 22 need not be the same length. Similarly, the first member 16 and the second member 20 need not be parallel. The length and respective orientation of the first and second links and the distance between the various pivot axis may vary from derailleur mechanism to derailleur mechanism. The derailleur mechanism 4 is shown as an example only. Any of a variety of bicycle chain derailleur mechanisms may be configured in a manner consistent with the present invention.

The movement of the cable C into the shield S is opposed by a spring 35. The spring 35 is shown hooked to a pin 38 which extends through the first member 16 and the first link 18. The pin 38 also defines the first pivot axis 24. The spring 35 is also shown hooked to a pin 40 with extends through the second member 20 and the second link 22. The pin 40 also defines the fourth pivot axis 28. It should be noted that it is not necessary for the spring 35 to be hooked to the pins 38 and 40. The spring 35 could be hooked to a portion of the link mechanism near the pivot axis 24 and 28. Further, the spring 35 could be hooked to the pins 38 and 40 and the pins 38 and 40 may be positioned off center from the pivot axis 24 and 28, respectively, to provide further mechanical advantage to the biasing of the spring 35. In other words, the position of the spring 35 in the link structure 5 shown in the figures is one example of a variety of positions where the spring 35 may be positioned to bias the link structure against the movement of the cable C.

Figure 3:
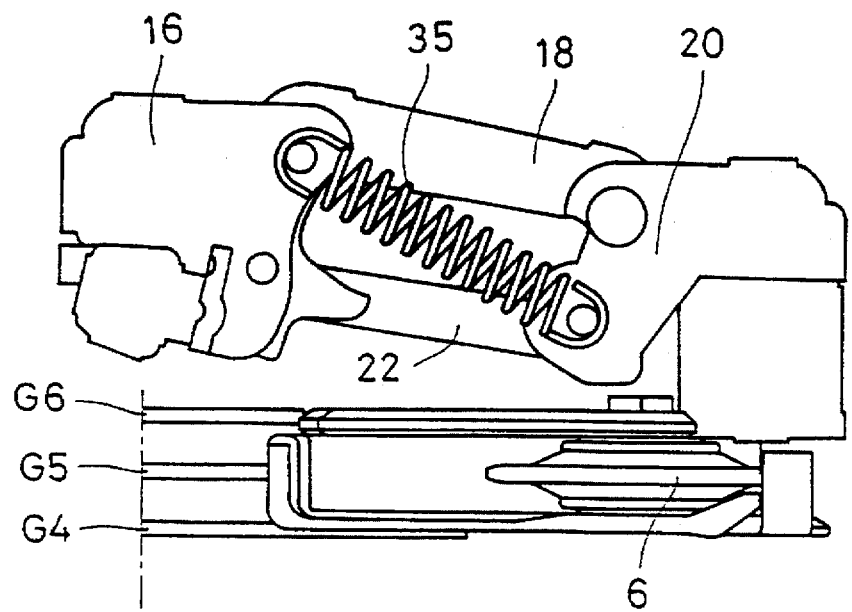
FIG. 3 is a schematic view, similar to FIG. 2, showing the link mechanism in a second position.

FIG. 3 shows link structure 5 in a second position with the guide wheel 12 and the tension wheel 6 positioned such that a chain (not shown) is directed to engage the gear G5. In FIG. 2, the link structure 5 is shown in a first position with the guide wheel 12 and the tension wheel 6 positioned such that a chain (not shown) is directed to engage the gear G6.

Figure 4:
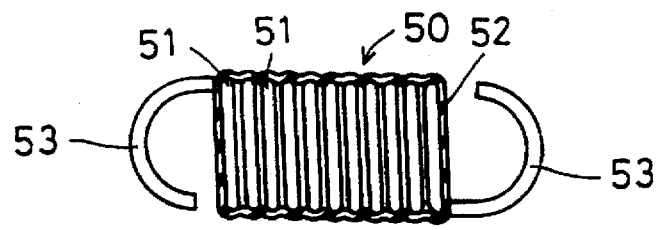
FIG. 4 is an elevation view showing a spring which may be employed in the link mechanism in accordance with one embodiment of the present invention, where the coil spring is shown removed from the link mechanism and the spring is coated with an elastomer.
Figure 5:
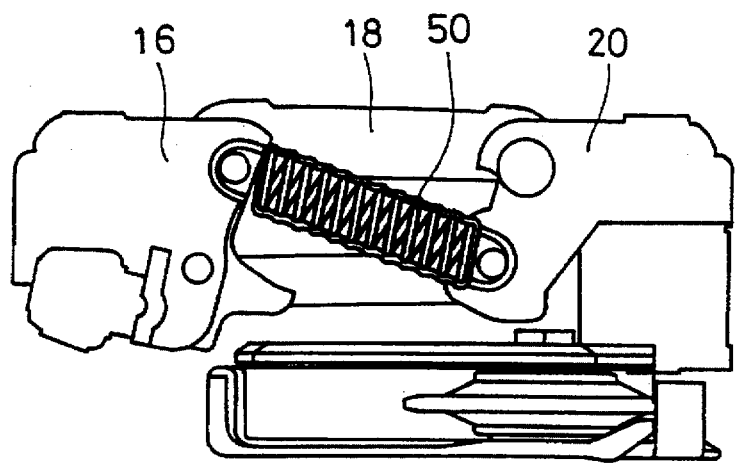
FIG. 5 is a sectional view of the chain derailleur depicted in FIG. 1, similar to FIG. 2, showing the coil spring coated with an elastomer depicted in FIG. 4 mounted in the link mechanism in accordance with the present invention.

In one embodiment of the present invention, shown in FIGS. 4 and 5, a spring 50 is a coil spring which is coated with an elastomer 52. The elastomer may be a synthetic rubber such as silicone rubber or nitrile rubber or the like. Further, the elastomer may be coated on the coils of the spring, a shrink fit process may be used or the spring may be submersed in a liquid bath of the elastomer and completely covered by the elastomer. One feature of the elastomer 52 is that it elastically connects each coil 51 to adjacent coils 51 increasing the biasing force characteristics of the spring 50. In effect, the elastomer 52 serves as a second spring biasing the link structure 5.

It should be noted in FIGS. 4 and 5 that only the coils 51 of the spring 50 are coated with the elastomer 52 and that the hook portions 53 of the spring 50 remain uncoated. However, the entire spring 50 may be coated with the elastomer 52 including the coils 51 and the hook portions 53. Further, in an alternate embodiment, the elastomer 52 may be a solid cylinder fitted into the hollow interior of the spring 50, elastically engaging each coil 51. Further, the elastomer 52 may be a solid cylinder fitted into the hollow interior of the spring 50 and may also coat the coils 51, as shown in FIG. 4.

Figure 6:
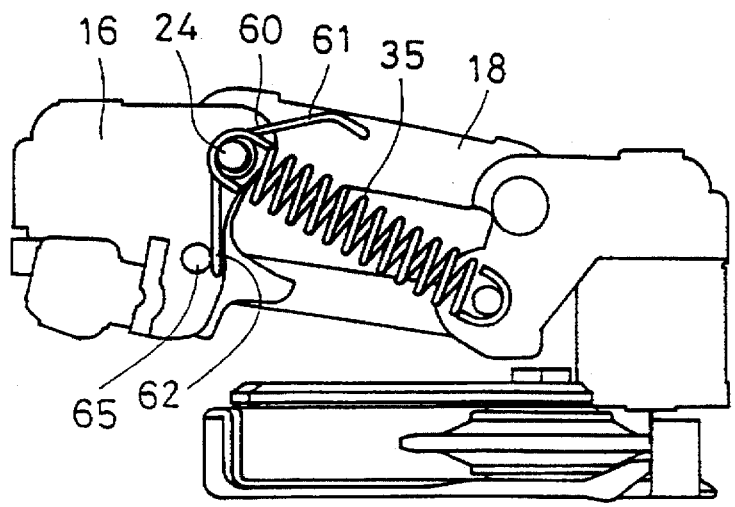
FIG. 6 is a sectional view of the chain derailleur depicted in FIG. 1, similar to FIG. 2, showing the link mechanism in accordance with an alternate embodiment of the present invention, where the link mechanism is biased by a coil spring and a torsion spring.

With reference now to FIG. 6, the link structure 5 is shown biased by two springs, specifically the first spring 35 and a second spring 60. The second spring 60 is a torsion spring which is fitted about the first pivot axis 24. The second spring 60 has a first end 61 and a second end 62, the first end 61 being confined within the first link 18 and the second end 62 being confined by a pin 65 fixed to the first member 16. The pin 65 may be concentric with the second pivot axis 30 or may be spaced apart from the second pivot axis 30. The second spring 60 biases the link structure 5 against the movement of the cable C, thus adding to the biasing force of the spring 35.

Figure 7:
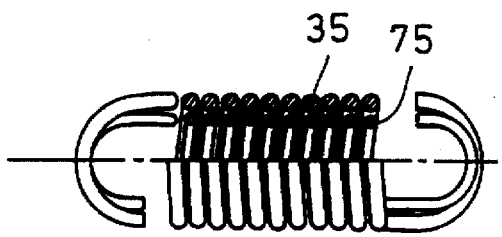
FIG. 7 is an elevation view showing a two concentric springs which may be employed in the link mechanism in accordance with another alternate embodiment of the present invention, where the coil spring is shown removed from the link mechanism.

In another embodiment of the present invention, shown in FIG. 7, the coil spring 35 may have a second coil spring 75 concentrically disposed within the coil portion of the coil spring 35 to increase the biasing force the spring 35 has on the link structure 5.

Figure 8:
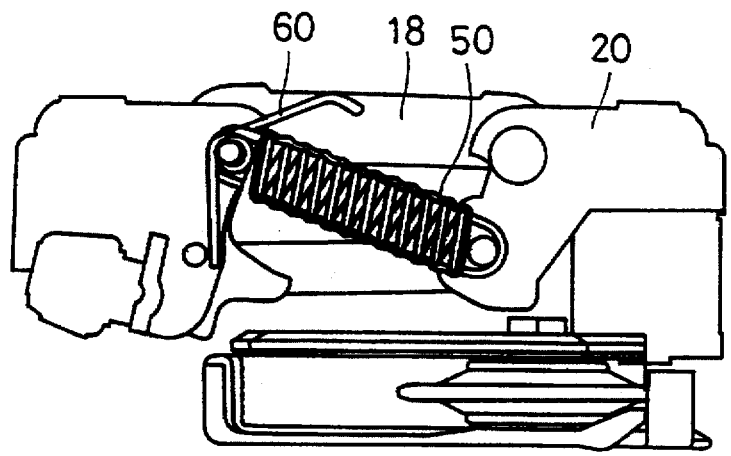
FIG. 8 is a sectional view of the chain derailleur depicted in FIG. 1, similar to FIG. 2, showing the link mechanism in accordance with still another alternate embodiment of the present invention, where the link mechanism is biased by a coil spring coated with an elastomer and a torsion spring.

In yet another embodiment of the present invention, shown in FIG. 8, the link structure 5 may be biased by the spring 50 having the coating of elastomer 52 thereon. The spring 50 is used in combination with the torsion spring 60 to oppose the movement of the cable C.

Figure 9:
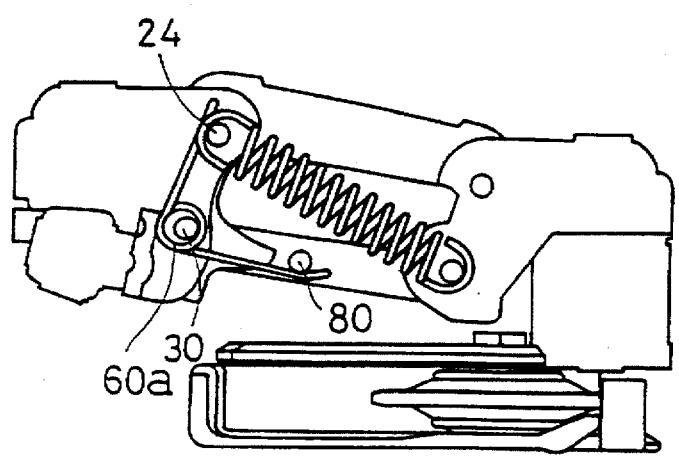
FIGS. 9, 10 and 11 are similar to FIG. 8 showing still further embodiments of the present invention.
Figure 10:
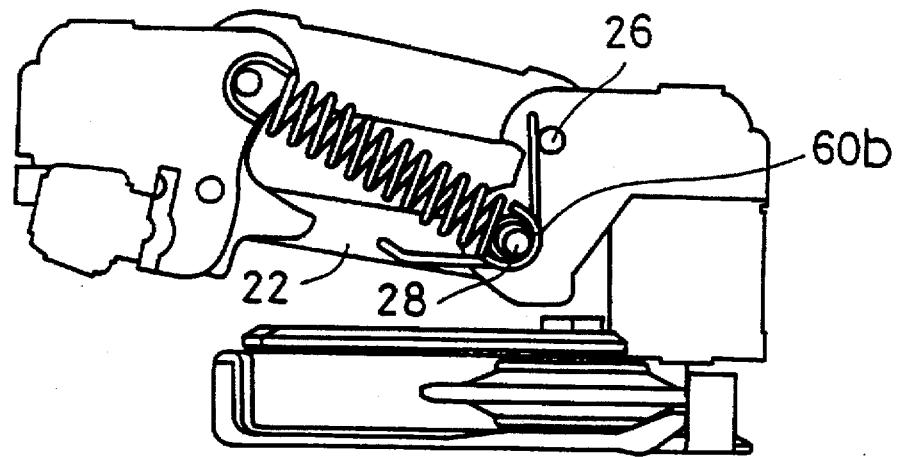
Figure 11:
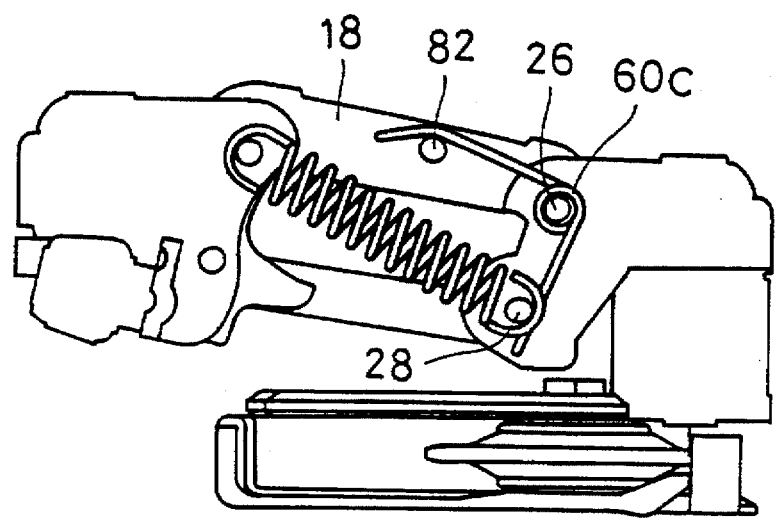

In the embodiments depicted in FIGS. 9, 10 and 11, a second spring is employed, the second spring being a torsion spring similar to the torsion spring 60 shown in FIGS. 6 and 8. In FIG. 9, a torsion spring 60a is mounted about the second pivot point 30 and provides a biasing force through contact with the pivot point 24 and a bracing pin 80 fixed to the second link 22. In FIG. 10, a torsion spring 60b is mounted about the fourth pivot point 28 and provides a biasing force through engagement with the third pivot point 26 and the second link 22. In FIG. 11, a torsion spring 60c is mounted about the third pivot point 26 and provides a biasing force through contact with the fourth pivot point 28 and a bracing pin 82 fixed to the first link 18.

Advantages to the above embodiment include an increase in the biasing force against the movement of the cable C without increasing the size of the link structure 5. For instance, by positioning the spring 35 on pins which define the pivot axis for elements of the link structure, mechanical advantage is gained by having the spring work directly from the pivot axis.

In the embodiment depicted in FIGS. 4 and 5, a second spring is employed to increase the biasing force urging the link structure against the movement of the cable C. However, in the embodiment shown in FIGS. 4 and 5, the second spring is an elastomer coating or member formed about a portion of the coils of the spring to, for instance, enhance the biasing properties of the coil spring.

In the embodiment depicted in FIG. 6, a second spring is also employed to increase the biasing force urging the link structure against the movement of the cable C. The second spring in this embodiment is a torsion spring.

In the embodiment depicted in FIG. 7, a second spring is also employed to increase the biasing force urging the link structure against the movement of the cable C. The second spring in this embodiment is a second coil spring concentrically disposed within the first spring.

In the embodiment of the present invention depicted in FIG. 8, a second and third spring are employed to increase the biasing force urging the link structure against the movement of the cable C. The second spring in this embodiment is a torsion spring. The third spring is an elastomer coating or member formed about a portion of the coils of the spring to, for instance, enhance the biasing properties of the coil spring.

In each of the embodiments, the link structure remains unaffected by any changes in size of the spring and the biasing force against the movement of the cable C is increased in a simple manner.

Various details of the invention may be changed without departing from its spirit nor its scope. Furthermore, the foregoing description of the embodiments according to the present invention is provided for the purpose of illustration only, and not for the purpose of limiting the invention as defined by the appended claims and their equivalents.

What is claimed:

1. A chain derailleur comprising:
   a base member;
   a link mechanism having:
      a first member connected to said base member, said first member having a first and second pivot axis defined thereon; first and second links, said first link mounted for pivotal movement to said first member at said first pivot axis, said second link mounted for pivotal movement to said first member at said second pivot axis;
      a second member having third and fourth pivot axis defined thereon, said first link mounted for pivotal movement to said second member at said third pivot axis, said second link mounted for pivotal movement to said second member at said fourth pivot axis;
      a first spring mounted within said link mechanism urging said first and fourth pivot axis toward one another, said first spring being a coil spring;
      a second spring mounted within said link mechanism to further urge said first and fourth pivot axis toward one another; and
   wherein said first spring has a first and a second end, said first end being connected to said first member adjacent to said first pivot axis and said second end being connected to said second member adjacent to said fourth pivot axis.

2. The chain derailleur as in claim 1 wherein said second spring is a torsion spring.

3. The chain derailleur as in claim 1 wherein said second spring is a torsion spring mounted about said first pivot axis, said torsion spring having first and second extending legs which engage a portion of said first member and a portion of said first link, respectively.

4. The chain derailleur as in claim 1 wherein said second spring is a torsion spring mounted about said second pivot axis, said torsion spring having first and second extending legs which engage a portion of said first member and a portion of said second link, respectively.

5. The chain derailleur as in claim 1 wherein said second spring is a torsion spring mounted about said third pivot axis, said torsion spring having first and second extending legs which engage a portion of said second member and a portion of said first link, respectively.

6. The chain derailleur as in claim 1 wherein said second spring is a torsion spring mounted about said fourth pivot axis, said torsion spring having first and second extending legs which engage a portion of said second member and a portion of said second link, respectively.

7. The chain derailleur as in claim 1 wherein said second spring is a second coil spring disposed concentrically within said first spring.

8. The chain derailleur as in claim 1 wherein said second spring is an elastomeric coating formed on said first spring.

9. The chain derailleur as in claim 1 wherein said first spring comprises a coil portion having an elastomeric coating formed on an outer periphery thereof, said elastomeric coating defining said second spring.

10. The chain derailleur as in claim 1 wherein said first spring comprises a coil portion having an elastomeric coating formed on at least two adjacent coils of said coil portion, said elastomeric coating defining said second spring.

11. The chain derailleur as set forth in claim 1 wherein said first pivot axis is defined by a first pin extending through said first member and said first end is connected to said first pin.

12. The chain derailleur as set forth in claim 1 wherein said fourth pivot axis is defined by a second pin extending through said second member and said second end is connected to said second pin.

13. A chain derailleur comprising:

a base member;

a link mechanism having:

a first member connected to said base member, said first member having a first and second pivot axis defined thereon;

first and second links, said first link mounted for pivotal movement to said first member at said first pivot axis, said second link mounted for pivotal movement to said first member at said second pivot axis;

a second member having third and fourth pivot axis defined thereon, said first link mounted for pivotal movement to said second member at said third pivot axis, said second link mounted for pivotal movement to said second member at said fourth pivot axis;

a first spring mounted within said link mechanism urging said first and fourth pivot axis toward one another, said first spring being a coil spring;

a second spring mounted within said link mechanism to further urge said first and fourth pivot axis toward one another; and wherein said first spring has a first and a second end, said first end being connected to said link mechanism proximate said first pivot axis and said second end being connected to said link mechanism proximate said fourth pivot axis.

14. The chain derailleur as set forth in claim 13 wherein said first pivot axis is defined by a first pin extending through said first member and said first link, and said first end is connected to said first pin.

15. The chain derailleur as set forth in claim 13 wherein said fourth pivot axis is defined by a second pin extending through said second member and said second link, and said second end is connected to said second pin.

16. The chain derailleur as set forth in claim 13 wherein:

said first pivot axis is defined by a first pin extending through said first member and said first link, and said first end is connected to said first pin; and said fourth pivot axis is defined by a second pin extending through said second member and said second link, and said second end is connected to said second pin.

* * * * *